s
UNITED STATES PATENT OFFICE.

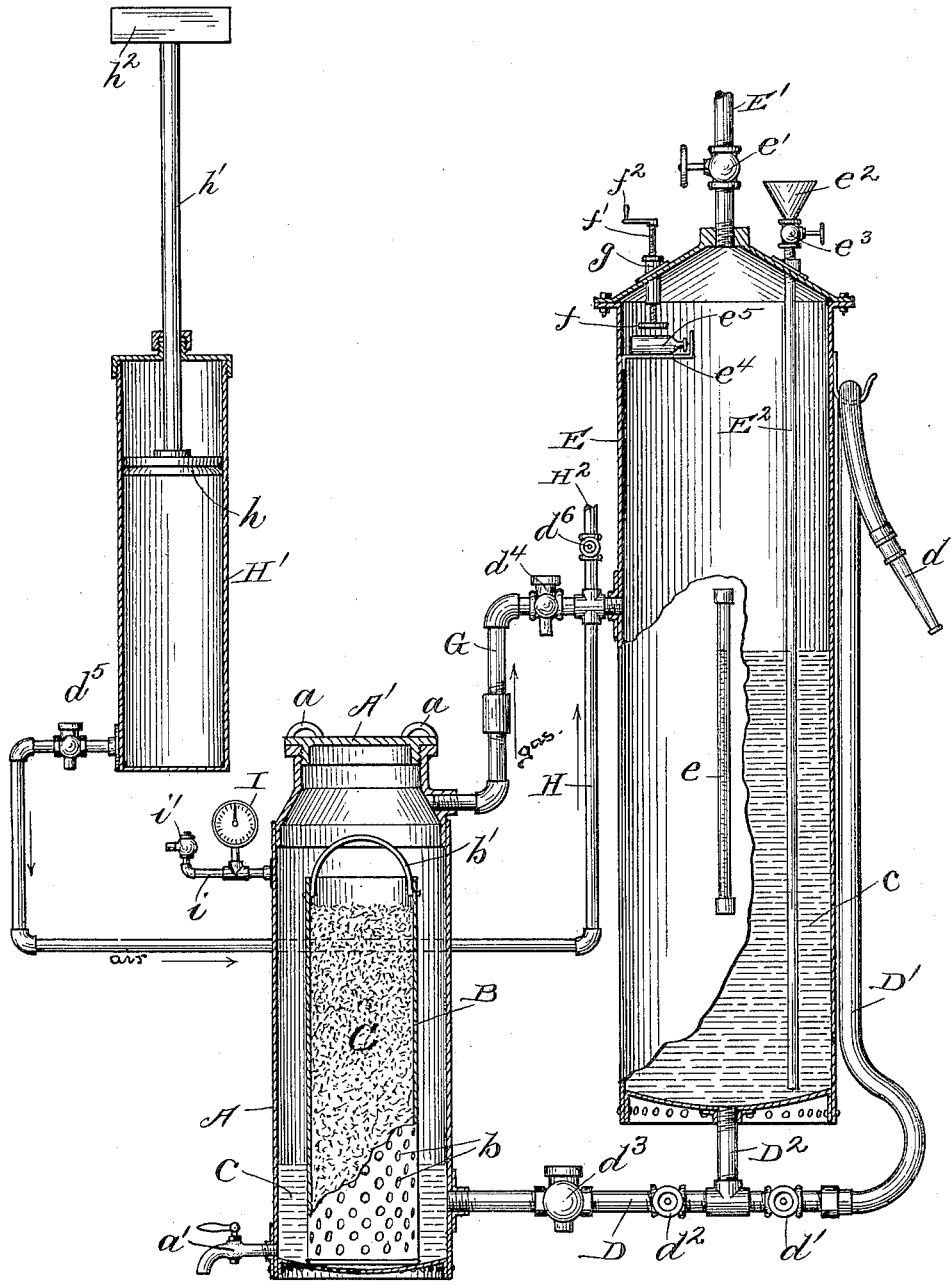

HENRY W. LAUN AND ERNEST E. LAUN, OF CHICAGO, ILLINOIS.

ACETYLENE-GAS GENERATOR.

SPECIFICATION forming part of Letters Patent No. 599,394, dated February 22, 1898.

Application filed December 24, 1896. Serial No. 616,866. (No model.)

*To all whom it may concern:*

Be it known that we, HENRY W. LAUN and ERNEST E. LAUN, citizens of the United States, residing at Chicago, in the county of Cook and State of Illinois, have invented certain new and useful Improvements in Gas Generators and Carbureters, of which the following is a specification.

This invention relates to that class of generators in which illuminating-gas is produced by means of chemicals or by charging or impregnating air with volatilized carbons to give it illuminating power; and it consists in certain details of construction, as hereinafter more fully described and claimed and as illustrated in the accompanying drawing, wherein the figure is a view, partly in elevation and partly in section, of the apparatus, showing the parts thereof connected, and illustrating a portion of the service-pipe.

A represents the generating vessel, which may be made of any suitable size, form, and material, but preferably cylindrical, and is provided at its top with a screw-threaded cap A' to engage some threads on the neck of the cylinder and to securely close the opening therein. This cap is provided with hand-pieces $a$ on its upper surface to be used for turning the same.

Within the generating vessel or cylinder A is placed a removable vessel B, usually cylindrical in form, which is formed with perforations $b$, as shown, to admit water $c$ to the carbonates C, composed of a high grade of charcoal and lime mixed and fused under intense heat, preferably by means of an electric fan, or other suitable chemicals or material used for generating gas. The vessel B is provided at its upper part with a bail $b'$ to be used for lifting it out of the vessel A when it is desired to remove the carbonates or other material and to refill it. The lower part of the vessel A is provided with a faucet $a'$ of the ordinary construction, through which the water may be drawn from the said vessel.

Connected to the lower portion of the generating vessel A is a generator-pipe D, to the outer end of which is coupled a piece of hose D', provided at its free end with a nozzle $d$, which may be used for extinguishing fires or for sprinkling purposes, as will be presently explained.

Communicating with the generator-pipe D and also with the bottom or lower portion of the reservoir E is a reservoir-pipe $D^2$, on each side of the juncture of which with the generator-pipe D is located in the last-named pipe shut-off valves $d'$ and $d^2$, and between the valve $d^2$ and the generating vessel A the generator-pipe D is provided with an automatic or self-acting regulating-valve $d^3$, which regulates the flow of water from the reservoir E to the generating vessel, and when the pressure in the generating vessel is sufficient it will cause said valve to close, thus cutting off the supply of water to the generator and automatically stopping the generation of gas. The reservoir is provided with a water-gage $e$ to indicate the quantity of water therein, and has at its top a service-pipe E', provided with a shut-off valve $e'$ for supplying and controlling, respectively, the flow of gas to the fixtures. Passing through the top of the reservoir E and extending to near its bottom is a pipe $E^2$, which may be provided at its top with a funnel $e^2$, through which and the pipe $E^2$ water or liquid may be passed into the reservoir. The upper end of the pipe $E^2$ is also provided with a valve $e^3$ to close the same to prevent the escape of water or gas.

Communicating with the upper portion of the generating vessel A and the reservoir E, at a point above the water therein, is a pipe G, which is provided with a regulating-valve $d^4$, which controls the passage of the gas between the generating vessel and the reservoir.

Communicating with the pipe G, between the regulating-valve $d^4$ thereof and the reservoir, is an air-pipe H, whose other end communicates with an air-cylinder H', which is provided with a piston $h$, the upper end of the rod $h'$ of which is provided with a weight $h^2$ to force the piston downward in the air-cylinder, thereby compressing the air and causing it to discharge through the pipe G into the reservoir, at which time it will mingle with or be impregnated by the gas from the generating vessel. The air-pipe H is provided near the air-cylinder H' with a regulating-valve $d^5$ of the ordinary or any preferred construction. Instead of using the air-cylinder H' and the pipe H leading therefrom we may connect with the pipe G, between its regulating-valve $d^4$ and the reservoir, another air-pipe $H^2$, through which air may be passed by any suitable means and which may be shut off by means of a valve $d^6$, located in said pipe.

The operation of our invention is simple and as follows: A sufficient quantity of water may be placed in the reservoir E, in which there is no abnormal pressure until gas shall have been produced in the generating-chamber, through the pipe $E^2$ and its funnel, and allowed to pass therefrom to the generating vessel A, in which the removable vessel B, containing calcium carbids or other carbonates or other suitable material, is located. As the water passes through the perforations $b$ to the material in the vessel B gas will be generated and will pass through the pipe G, together with air from the pipes H or $H^2$, into the reservoir and out through the service-pipe. When the gas is shut off by means of the valve $e'$ in the supply-pipe, the pressure will automatically close the valve $d^3$ in the pipe D, thus shutting off the supply of water from the reservoir and stopping the generation of gas. As gas is exhausted from the reservoir through the service-pipe $E'$ it is apparent that the valve $d^3$ will be automatically opened and that the water will again flow from the reservoir into the generating vessel, when the generation of gas will be resumed and continued until the supply of air and gas is again shut off, the degree of pressure in the generating chamber or vessel being shown by means of an indicator I, located on a pipe $i$ in the upper part of the generating vessel, the outer portion of which pipe is provided with a safety-valve $i'$ of the ordinary or any preferred construction.

It is obvious that by extending the pipe E to near the bottom of the reservoir water or other suitable liquid may be passed therethrough without the possibility of gas escaping, as the lower end of the pipe will extend below the surface of the water.

When water is admitted to the reservoir through the pipe $E^2$, there may be a quantity of gas in the upper portion of the reservoir, but the pressure therein is not sufficient to prevent the introduction of the water. As the air passes from the cylinder $H'$ under pressure into the reservoir it is impregnated or charged with the volatilized hydrocarbons to give it illuminating power, as is well understood.

Having thus fully described our invention, what we claim as new, and desire to secure by Letters Patent, is—

In a gas-generator, the combination with the generator proper, A, and a single reservoir E for gas and water, a service-pipe $E'$ leading from the upper end of the reservoir, a pipe $D^2$ leading from the bottom thereof, and a pipe D leading from near the bottom of the generator and connecting with and extending beyond said pipe $D^2$, a cut-off $d^2$ and an automatic valve $d^3$ in said pipe between the generator and the point of connection with the pipe $D^2$, and a cut-off $d'$ in the free end of said pipe beyond the point of connection; of a pipe G connecting the reservoir and generator above the water-lines therein, an automatic valve $d^4$ in this pipe, a second pipe H communicating therewith, and means for supplying air thereto, all substantially as and for the purpose set forth.

Chicago, Ill., December 19, 1896.

HENRY W. LAUN.
ERNEST E. LAUN.

Witnesses:
CHAS. C. TILLMAN,
E. A. DUGGAN.